(12) United States Patent
Owen

(10) Patent No.: US 8,537,943 B1
(45) Date of Patent: Sep. 17, 2013

(54) SUM AND FORWARD ELAM RECEIVER

(75) Inventor: Henry Owen, Medford, NJ (US)

(73) Assignee: Greenwich Technology Associates, Darien, CT (US)

( * ) Notice: Subject to any disclaimer, the term of this patent is extended or adjusted under 35 U.S.C. 154(b) by 185 days.

(21) Appl. No.: 13/220,311

(22) Filed: Aug. 29, 2011

Related U.S. Application Data (60) Provisional application No. 61/377,906, filed on Aug. 27, 2010.

(51) Int. Cl.
*H04B 7/10* (2006.01)
*H04L 1/02* (2006.01)

(52) U.S. Cl.
USPC .......................... 375/347; 375/136; 375/147

(58) Field of Classification Search
USPC ................. 375/136, 142, 147, 150, 343, 347
See application file for complete search history.

(56) References Cited

U.S. PATENT DOCUMENTS

| 6,563,860 | B2 * | 5/2003 | Schilling ...................... 375/148 |
| 6,608,588 | B2 | 8/2003 | Elam |
| 6,823,021 | B1 | 11/2004 | Elam |
| 7,965,794 | B2 | 6/2011 | Elam |

\* cited by examiner

*Primary Examiner* — Curtis Odom
(74) *Attorney, Agent, or Firm* — Snyder, Clark, Lesch & Chung, LLP (57) ABSTRACT

A method for receiving signals in a receiver having a plurality of receive elements may include a transmitted signal in a plurality of receive elements to form a plurality of receive element signals, generating a plurality of uncorrelated chipping sequences, and encoding each the plurality of receive element signals with a different one of the chipping sequences to form a plurality of encoded signals, and combining the plurality of encoded signals into a combined signal. The plurality of encoded signals may include a first encoded signal, a second encoded signal, and a third encoded signal. Combining may include combining the first encoded signal with the second encoded signal to generate a first combined signal, and combining the first combined signal with information indicative of the third encoded signal to generate a second combined signal.

20 Claims, 9 Drawing Sheets

SUM AND FORWARD ELAM RECEIVER

RELATED APPLICATIONS

This application claims priority to U.S. Provisional Application No. 61/377,906, filed Aug. 27, 2010, which is incorporated herein by reference.

BACKGROUND

Beamforming can play a role in maintaining wireless communications in an environment where an adversary maliciously attempts to disrupt communications. For example, beamforming can be used to geolocate an adversary (e.g., direction of arrival (DoA) of a signal) that is actively attempting to jam or deny use of the RF spectrum. Further, beamforming may also boost the sensitivity of receiver arrays to receive signals of interest.

DETAILED DESCRIPTION

The following description of embodiments of the present invention refers to the accompanying drawings. Where appropriate, the same reference numbers in different drawings refer to the same or similar elements.

In embodiments described below, distributed radios (e.g., cognitive radios and/or randomly distributed radios) may act as distributed elements of an antenna array (e.g., a randomly distributed array). The Elam receiver, for example, may be used with signals/data captured by the distributed elements or nodes of the antenna array. These embodiments may enable flexible beamforming (e.g., beamforming with multiple beams formed simultaneously). These embodiments may also allow for flexible beamforming while using less bandwidth and less transmit power to aggregate the data from the array elements (e.g., for transmission to a central or remote location) as compared to other traditional beamforming techniques.

Figure 1:
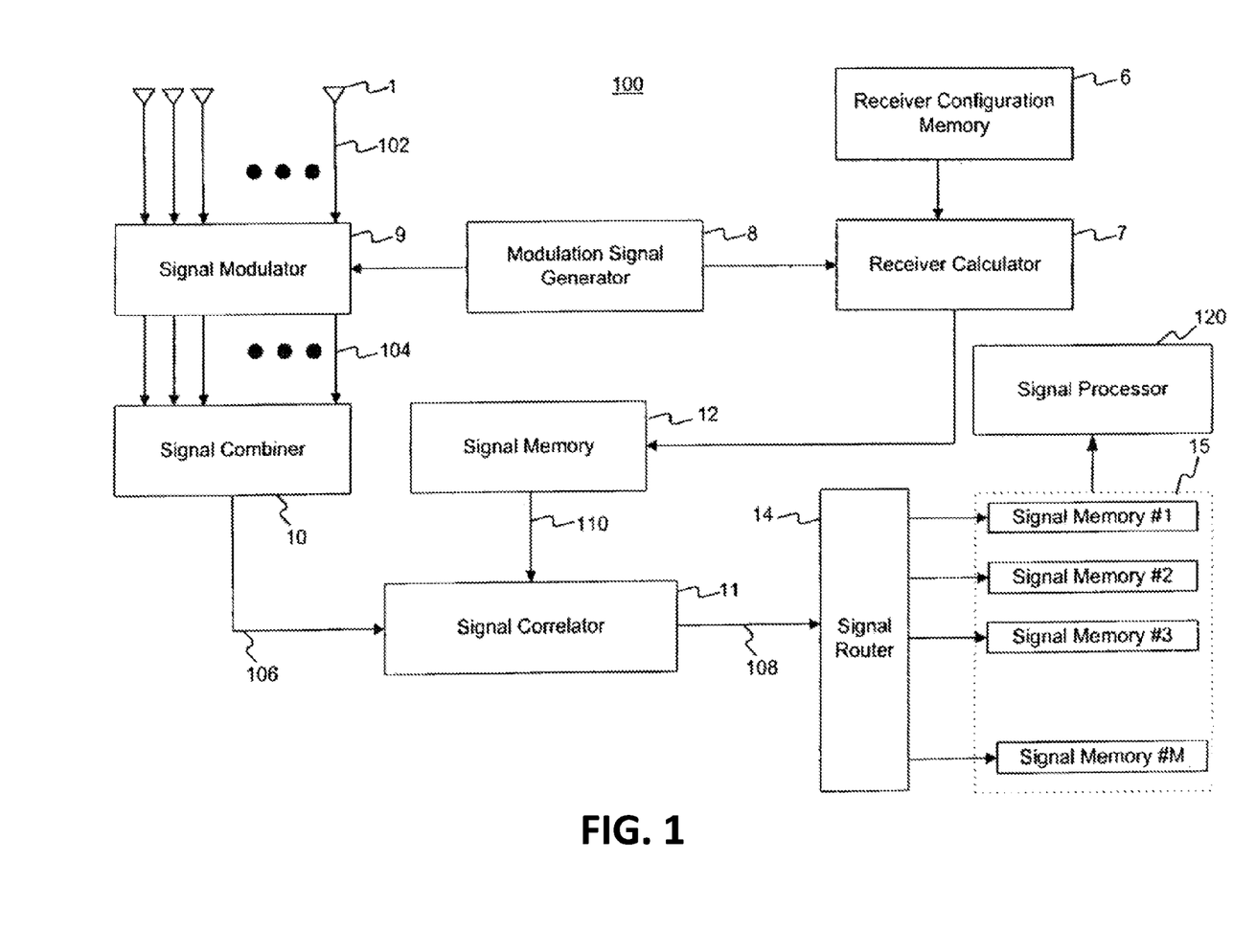
FIG. 1 is a block diagram of exemplary components of an Elam receiver.

FIG. 1 is a block diagram of an Elam receiver 100 disclosed in U.S. Pat. No. 6,823,021, issued Nov. 23, 2004, which is incorporated herein by reference. Receiver 100 comprises an array 1 having a plurality of receive elements, a modulation signal generator 8, a signal modulator 9, a signal combiner 10, a receiver configuration memory 6, a receiver calculator 7, a signal memory 12, a signal correlator 11, a signal router 14, a plurality of signal memories 15, and a signal processor 120.

Propagating signals impinge on array 1, and the plurality of elements receive the signals to form a plurality of receive element signals. The plurality of receive element signals are conveyed (via lines 102) to a signal modulator 9. Modulation signal generator 8 generates phase modulation signals (or chipping sequences) for the receive elements of array 1. These phase modulation signals may be arbitrary or uncorrelated (correlation less than one) from each other. The phase modulation signals may be arbitrary in that they may not be correlated with, or otherwise dependent on, the geometry of the elements of array 1. The phase modulation signals may be independent of the direction of the transmitted signal. Signal modulator 9 phase modulates, or "chips," each element signal with one of the phase modulation signals generated by modulation signal generator 8.

Phase modulated signals 104 are output from signal modulator 9 to signal combiner 10. Signal combiner 10 combines the phase modulated signals 104 into combined signal 106. In one embodiment, signal combiner 10 sums, chip by chip, the plurality of phase modulated signals to form combined signal 106. For example, all of the first chips from first phase modulated signal through the last phase modulated signal are added to form a combined signal first chip, all of the second chips from the first phase modulated signal through the last phase modulated signal are added to form a combined second chip, and so forth. Each chip of combined signal 106 may have a vector magnitude that conforms to a Rayleigh density function and has a random phase angle. Combined signal 106 is output from signal combiner 10 to a signal correlator 11 (via line 106).

Receiver calculator 7 calculates the expected signal. The expected signal is the signal that the combined signal 106 is expected to be if an unmodulated carrier were transmitted from a particular direction relative to array 1. Receive calculator 7 may generate an expected signal for a carrier from the direction of particular transmitter. Receiver calculator 7 inputs information from modulation signal generator 8 and receiver configuration memory 6 in order to calculate the expected signal. Receiver configuration memory 6 may provide information that affects the amplitude, phase, and polarization of receive element signals and phase modulated signals before being combined in signal combiner 10. This information may include the carrier frequency of propagating signals, their estimated direction the configuration of the receive elements within array 1, and the transmission line lengths of the elements.

Modulation signal generator 8 may provide information giving the relative phase of each chip within the phase modulation signals. Receiver calculator 7 calculates and outputs the expected signal to the signal memory 12 for temporary storage. The expected signal is output from the signal memory 12 and input to signal correlator 11. Because the polarization of the transmitted signal may influence the phase and magnitude of the combined signal, receiver calculator 7 may calculate the expected signal based upon an assumed polarization of the transmitted signal.

Signal correlator 11 inputs combined signal 106 and the expected signal and correlates the two signals. In one embodiment, signal correlator 11 may cross-correlate the corresponding N consecutive chips of combined signal 106 and the expected signal. Signal correlator 11 may perform a new cross-correlation between combined signal 106 and the expected signal each time N new chips of combined signal 106 enters correlator 11. Each time a new correlation is performed, receiver calculator 7 may update the expected signal to include the next N chips and may delete the previous chips so that the value of N may remain constant, for example.

Signal correlator 11 produces an output that is a measure of the correlation (e.g., cross-correlation) of combined signal 106 and the expected signal. Signal correlator 11 produces an output that is the correlation signal for receiver 100 "looking"

in the direction of a remote transmitter, for example, provided that the expected signal being cross-correlated with combined signal 106 is that from the direction of the transmitter. The correlation signal is output to signal router 14.

A plurality of expected signals may be generated, each for a corresponding different direction. Combined signal 106 may be correlated with each of the plurality of expected signals to form a plurality of correlation signals. For example, receive calculator may generate an expected signal for a carrier from a first direction of a first transmitter and an expected signal for a carrier of the same or different frequency from a second direction of a second transmitter. Thus, receiver 100 may simultaneously "look" in multiple (M) directions at one time, and receiver calculator 7 may generate M expected signals and signal correlator 11 may cross-correlate M expected signals with combined signal 106 to form M correlation signals. Each correlation signal is the detection signal for receiver 100 "looking" in that one particular direction. The M correlation signals are output to signal router 14 (via line 108).

Methods and systems consistent with this invention store the M correlation signals in correlation signal memory 15 and analyze the correlation signals. Using signal processor 120, information such as voice or other data is extracted from the correlation signals. Signal router 14 passes each of the M correlation signals to one of the several signal memory units 1 to M, respectively. Signal memory units 1 to M store successive correlation signals from an assigned direction 1 to M, respectively.

Figure 2:
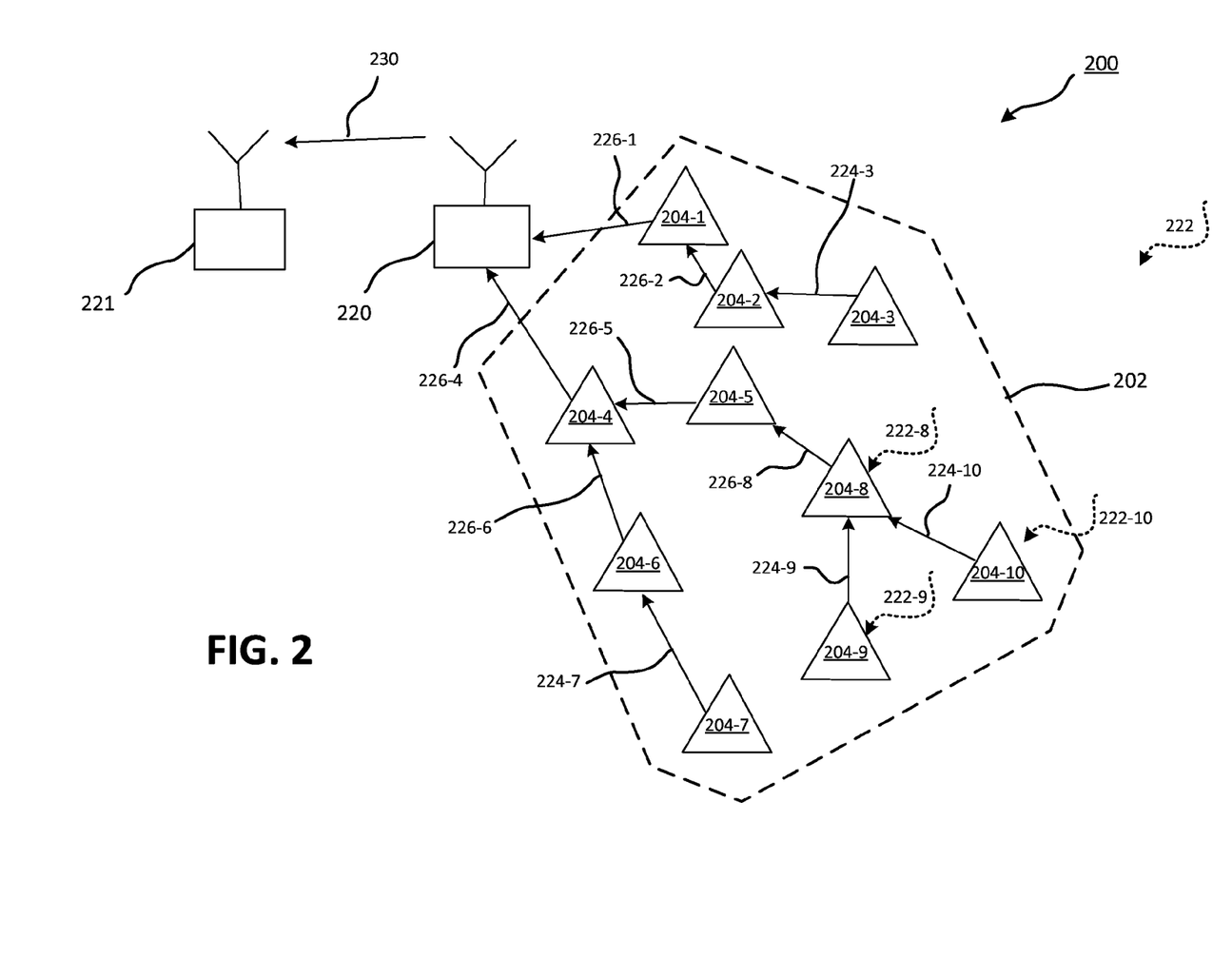
FIG. 2 illustrates an environment in which embodiments described may be implemented.

FIG. 2 illustrates an environment 200 in which embodiments described below may be implemented. An array may include a collection of radio nodes 204 (e.g., an ad hoc collection of cognitive radio nodes) (individually node 204-$x$). Nodes 204 may be distributed randomly over an irregular or uneven terrain, for example. Nodes 204 may form a conformal array. The array may be sparse and may cover an aperture area 202. Each node 204-$x$ may correspond to one element of array 1 of receiver 100, for example.

Figure 3A:
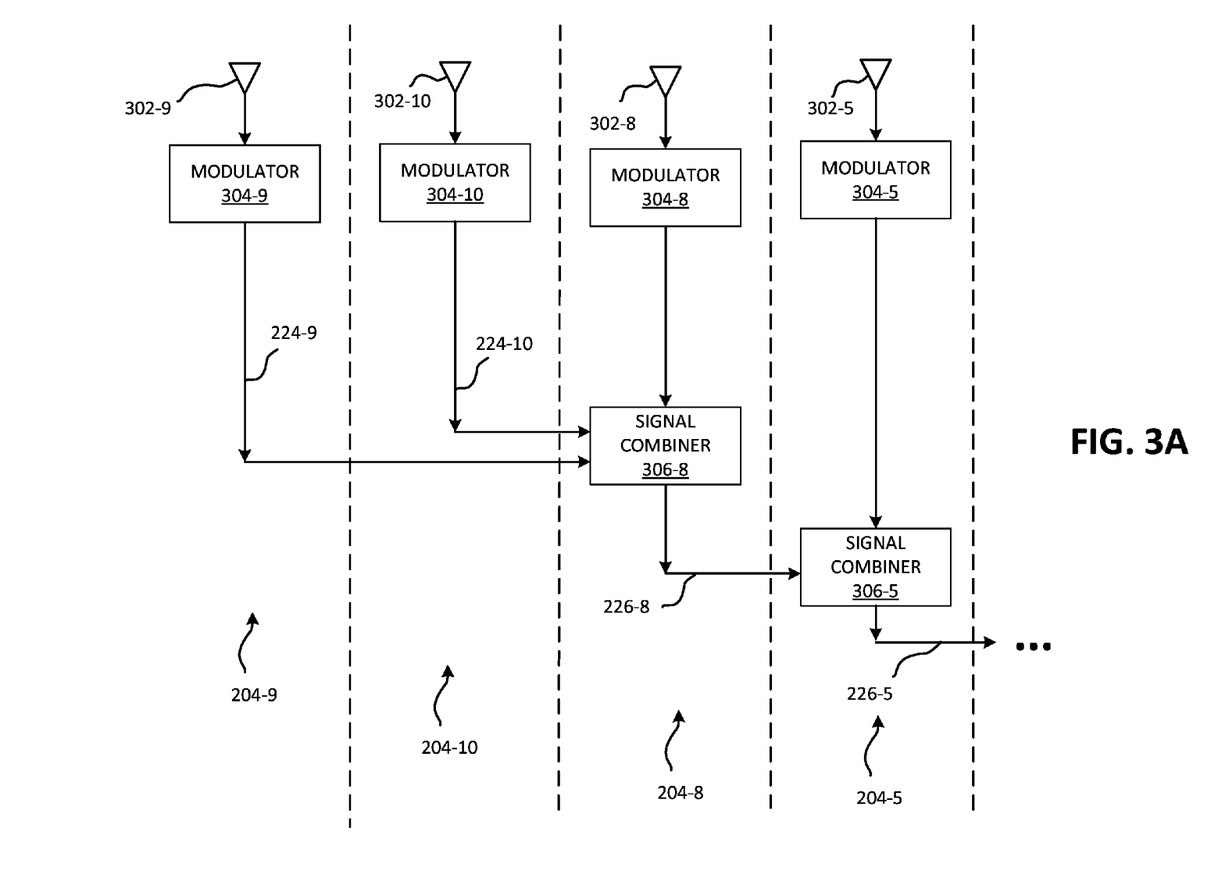
FIGS. 3A and 3B are block diagrams of exemplary components of the nodes in the environment of FIG. 2.

FIG. 3A is a block diagram of exemplary components of a nodes 204. As shown in FIG. 3A, each node 204-$x$ may include an antenna element 302-$x$. Each antenna element 302-$x$ may correspond to one of the antenna elements 1 of receiver 100, for example. Each node 204-$x$ may also include a modulator 304-$x$. Modulators 304 may correspond to signal modulator 9 of receiver 100, for example. Each node 204-$x$ may also include a signal combiner 306-$x$ (not shown for node 204-9 or node 204-10). As shown in FIG. 3A, signal combiner 306-8 may combine the modulated signals from modulator 304-9, modulator 304-10, and modulator 304-8. Node 204-8 forwards the combined signal to combiner 306-5. Signal combiner 306-5, in turn, combines the signal forwarded from node 204-8 and the output of modulator 304-5. Combiners 306 may correspond to signal combiner 10 of receiver 100. As shown in FIG. 3A, combiners 306 may combine (e.g., sum) the modulated signals in steps.

Figure 3B:
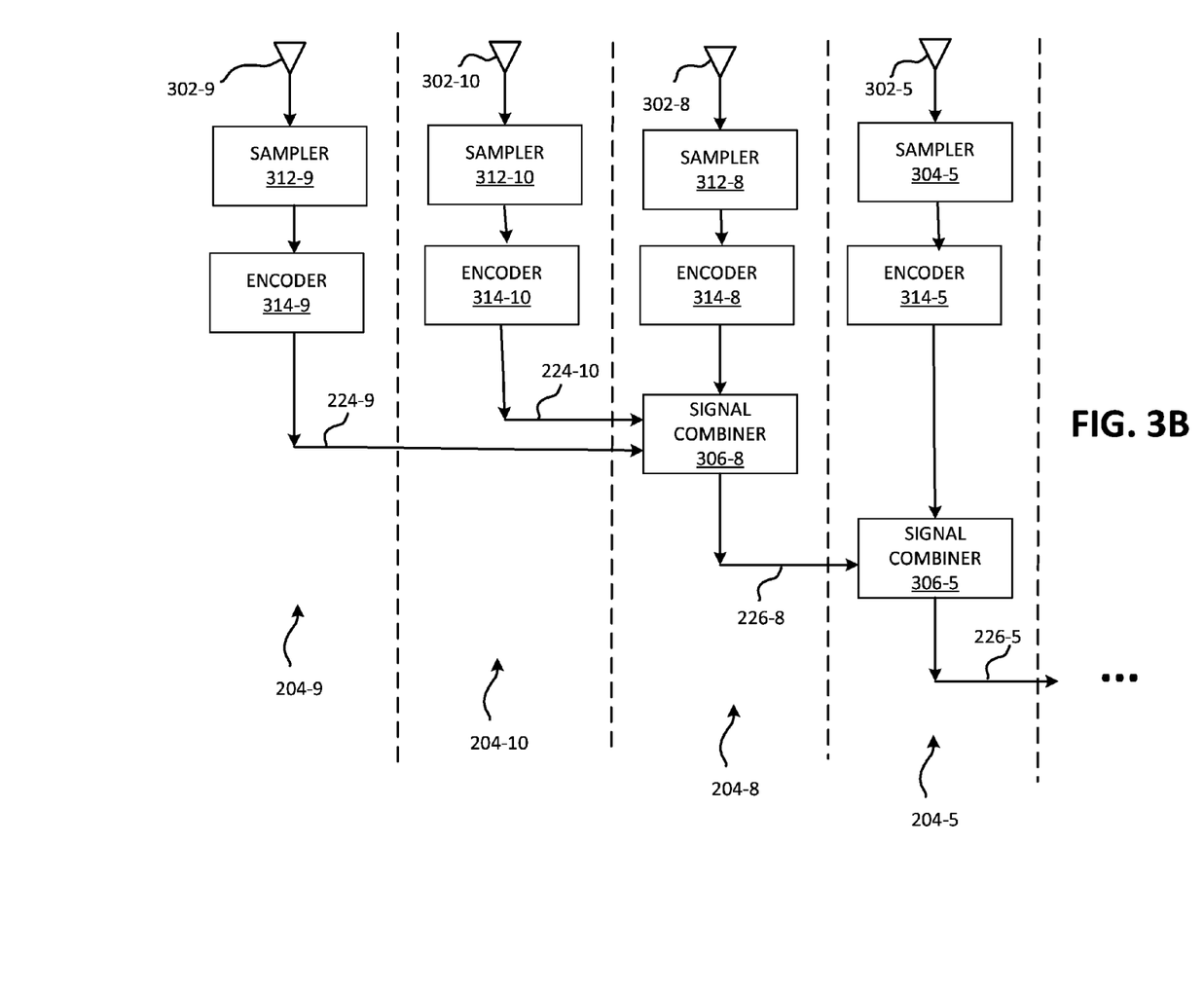

FIG. 3B is a block diagram of exemplary components of nodes 204 in another embodiment. As shown in FIG. 3B, each node 204-$x$ may include a signal sampler 312-$x$ and an encoder 314. Samplers 312 and encoders 314 may correspond to modulators 304 shown in FIG. 3A. Samplers 312 and encoders 314 may also correspond to signal modulator 9 of receiver 100. Samplers 312 may sample the signals received in antenna elements 302. Encoders 314 may "chip" the sampled signals. Samplers 312 and encoders 314 may do in the digital domain what modulators 304 (FIG. 3A) and modulator 9 (FIG. 1) did in the analog domain.

Figure 4:
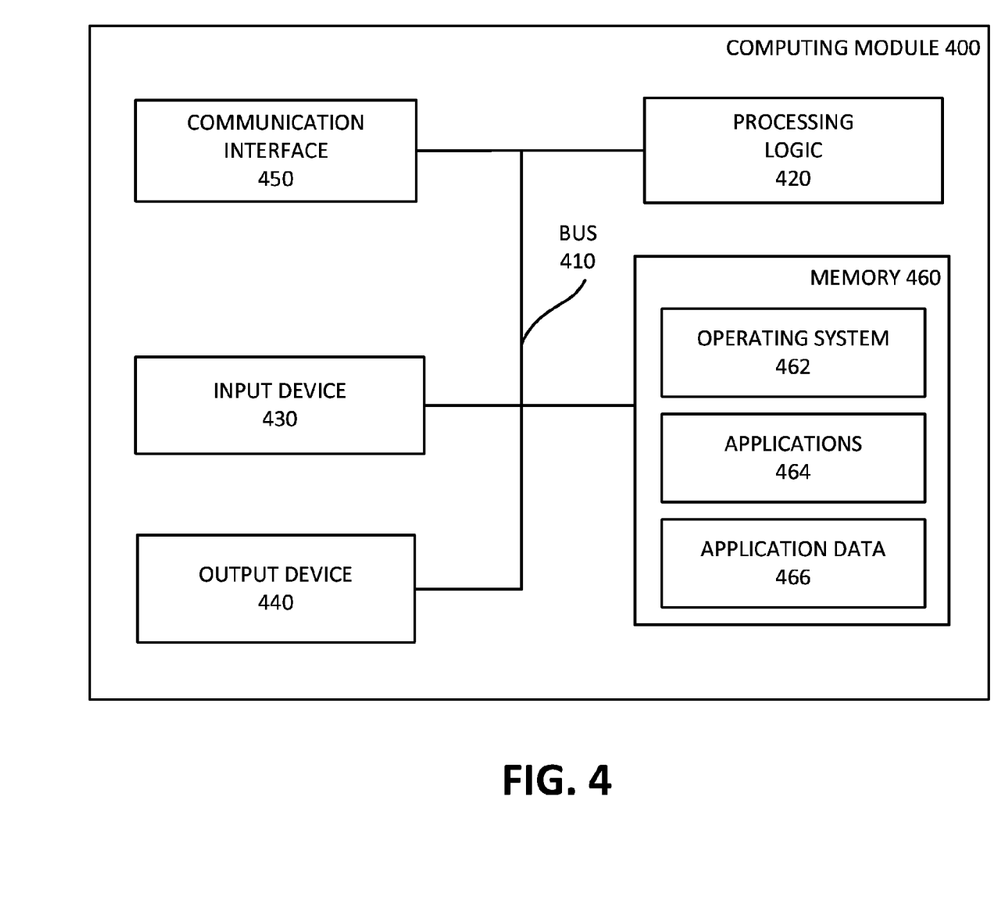
FIG. 4 is a block diagram of an exemplary computing module in the nodes in the environment of FIG. 2.

Receiver 100 and the nodes of FIG. 2 (e.g., the nodes or a device at location 120) may include one or more computing modules. FIG. 4 is a block diagram of exemplary components of a computing module 400. Computing module 400 may include a bus 410, processing logic 420, an input device 430, an output device 440, a communication interface 450, and a memory 460. Computing module 400 may include other components (not shown) that aid in receiving, transmitting, and/or processing data. Moreover, other configurations of components in computing module 400 are possible.

Bus 410 may include a path that permits communication among the components of computing module 400. Processing logic 420 may include any type of processor or microprocessor (or families of processors or microprocessors) that interprets and executes instructions. In other embodiments, processing logic 420 may include an application-specific integrated circuit (ASIC), a field-programmable gate array (FPGA), etc.

Communication interface 450 may include a transceiver that enables computing module 400 to communicate with other devices or systems. Communication interface 450 may include a transmitter that converts baseband signals to radio frequency (RF) signals or a receiver that converts RF signals to baseband signals. Communication interface 450 may be coupled to one or more antennas for transmitting and receiving RF signals. Communication interface 450 may include phase shifters or time delays for modulating received signals. Communication interface 450 may include a network interface card, e.g., Ethernet card, for wired communications or a wireless network interface (e.g., a WiFi) card for wireless communications. Communication interface 450 may also include, for example, a universal serial bus (USB) port for communications over a cable, a Bluetooth™ wireless interface, a radio-frequency identification (RFID) interface, a near-field communications (NFC) wireless interface, etc.

Memory 460 may store, among other things, information and instructions (e.g., applications 364 and operating system 362) and data (e.g., application data 366) for use by processing logic 420. Memory 460 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 362 may include software instructions for managing hardware and software resources of computing module 400. For example, operating system 362 may include GNU/Linux, Windows, OS X, Android, an embedded operating system, etc. Applications 364 and application data 366 may provide network services or include applications, depending on the device in which the particular computing module 400 is found.

Input device 430 may allow a user to input information into computing module 400. Input device 430 may include a keyboard, a mouse, a pen, a microphone, an audio capture device, an image and/or video capture device, a touch-screen display, etc. Some devices, such as the nodes, may be autonomous, may be managed remotely, and may not include input device 430. In other words, some devices may be "headless" and may not include a keyboard, for example.

Output device 340 may output information to the user. Output device 340 may include a display, a printer, a speaker, etc. As another example, the nodes may include light-emitting diodes (LEDs). Headless devices, such as one or more of the nodes, may be autonomous, may be managed remotely, and may not include output device 340.

Input device 430 and output device 340 may allow a user to activate and interact with a particular service or application. Input device 430 and output device 340 may allow a user to receive and view a menu of options and select from the menu options. The menu may allow the user to select various functions or services associated with applications executed by computing module 400.

Computing module 400 may perform the operations described herein in response to processing logic 420 executing software instructions contained in a computer-readable medium, such as memory 460. A computer-readable medium include a physical or logical memory device. The software instructions may be read into memory 460 from another computer-readable medium or from another device via communication interface 450. The software instructions contained in memory 460 may cause processing logic 420 to perform processes that are described herein.

In the case of a node, communication interface 450 may receive signals and may perform some signal processing, as described above (e.g., as part of a distributed array in an Elam receiver). Communication interface 450 may also transmit received signals, e.g., after some signal processing, to other nodes. Communication interface 450 may also receive signals from other nodes. Application 464 may sum the signals from other nodes, along with the signal received and processed as part of a distributed Elam receiver, for forwarding to other nodes.

Figure 5:
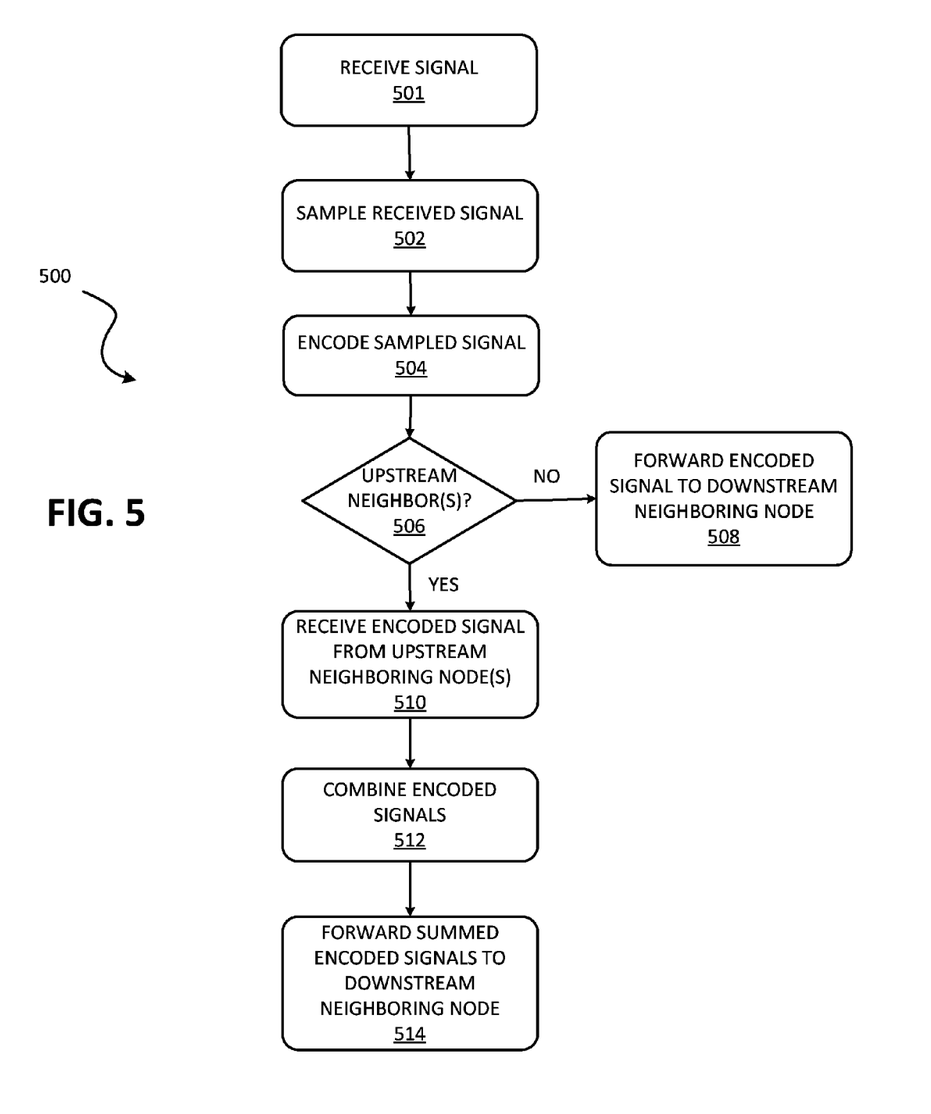
FIGS. 5 and 6 are flowcharts of exemplary processes for receiving and processing signals according to the embodiments.
Figure 6:
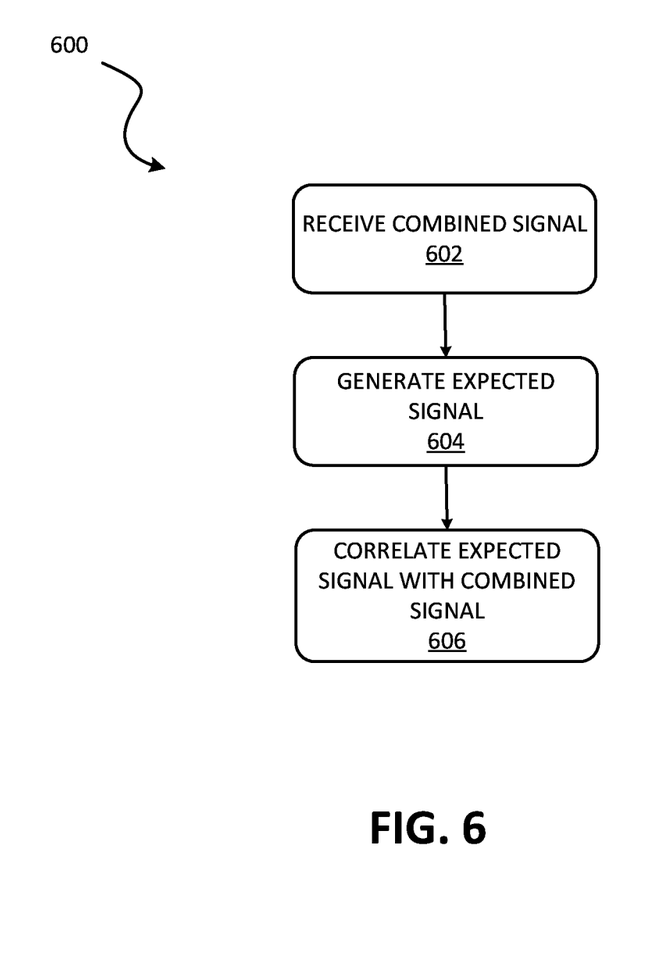

FIGS. 5 and 6 are flowcharts exemplary processes 500 and 600 for receiving and processing signals according to the embodiments disclosed herein. Process 500 may be performed in each node 204 in environment 200, for example. Process 500 is described with respect to FIGS. 2 and 3B.

Process 500 begins with the receipt of a signal of interest (block 501) that is sampled (block 502) (e.g., coherently) at an appropriate rate. For example, as shown in FIGS. 2 and 3B, a signal 222 propagates through space where signal 222-8 impinges on node 204-8 (e.g., node 204-8 receives signal 222-8), signal 222-10 impinges node 204-10 (e.g., node 204-10 receives signal 222-10), signal 222-9 impinges on node 204-8, etc. In the case of node 204-10, sampler 312-10 may sample the signal and pass the sampled signal to encoder 314-10. The sampled signal may be encoded (block 504) by applying a chipping sequence. Encoding may also be considered modulating (e.g., phase modulating). In this embodiment, the chipping sequence may identify (e.g., uniquely stamp) the signal from the corresponding node, e.g., node 204-10. Similarly, in the example of FIG. 2, signal 222-9 is received by node 204-9, sampled by sampler 312-9, and encoded by encoder 314-9.

In one embodiment, the chipping sequences may be uncorrelated from each other. For instance, the uncorrelated random phase signals may have a correlation less than 1, but greater than 0.75; less than or equal to 0.75, but greater than 0.50; less than or equal to 0.50, but greater than 0.25; less than or equal to 0.25, but greater than or equal to zero. On the other hand, some or all of these chipping sequences may be well correlated or even be identical. The chipping sequences may be arbitrary in that they may not be correlated with, or otherwise dependent on, the geometry of the elements of array 1. The chipping sequences may be independent of the direction of the transmitted signal. In one embodiment, the chipping sequences may each be random (e.g., pseudo-random and/or random and uncorrelated). In another embodiment, the chipping sequences may each be uncorrelated and orthogonal.

If there is no upstream neighboring node (block 506: NO), then the encoded signal may be forwarded to the neighboring downstream node (block 508). In the case of node 204-10, as shown in FIGS. 2 and 3B, encoded signal 224-10 is forwarded to the neighboring downstream node 204-8. Likewise, in the case of node 204-9, for example, encoded signal 224-9 is forwarded to the neighboring downstream node 204-8. As process 500 may be performed in each node 204, in the case of node 204-7, encoded signal 224-7 is forwarded to the neighboring downstream node 204-6; in the case of node 204-3, encoded signal 224-3 is forwarded to neighboring downstream node 204-2.

If the node, however, has upstream neighbor(s) (block 506: YES), then the node may receive an encoded signal (or the combination of encoded signals) from the upstream neighboring node(s) (block 510). In the example of FIG. 2, node 204-8 has two upstream neighbors: node 204-9 and 204-10. In this case, node 204-8 receives encoded signal 224-9 and encoded signal 224-10. The node (e.g., combiner 306-8 in the case of node 204-8) may combine (e.g., sum) the received encoded signal (or the combination of encoded signals) with the encoded sampled signal (block 508). For example, node 204-8 receives a signal 222-8, sampler 312-8 samples received signal 222-8, and encoder 314-8 encodes the sampled signal. Combiner 306-8 in node 104-8 then combines the encoded sampled signal (output from encoder 314-8) with received encoded signal 224-9 and received encoded signal 224-10. In one embodiment, encoded signal 224-9 represents a particular time period, encoded signal 224-10 represents the same time period, and the encoded signal derived from received signal 222-8 also represents the same time period. The combined signal may be forwarded to the neighboring downstream node (block 514). In the example of FIG. 2, node 204-8 forwards combined signal 226-8 to node 204-5.

Process 500 repeats (e.g., forwarding and combining) for a given time period at each node 204 until data for a given time period is held at one node (e.g., a central node 220). In the example of FIG. 2, node 204-5 adds encoded signal 226-8 (which is already a combination of encoded signals) to its own encoded signal (output from encoder 314-5) and forwards encoded signal 226-5 to node 204-4; node 204-6 combines encoded signal 224-7 to its own encoded signal and forwards encoded signal 226-6 to node 204-4; node 204-4 combines encoded signal 226-6 (which is already the combination of two encoded signals), encoded signal 226-5, and its own encoded signal and transmits encoded signal 226-4 to node 220; node 204-2 combines encoded signal 224-3 and its own encoded signal and forwards encoded signal 226-2 to node 204-1; and node 204-1 combines encoded signal 226-2 (which is already the combination of two encoded signals) to its own encoded signal and forwards encoded signal 226-1 to node 220. Central node 220 may combine encoded signals 226-4 and encoded signal 226-1 to generate one encoded signal.

Central node 220 may serve as a radio 'backhaul' that transmits the combined signal to another node 221 at a different location. Node 221 may include a device for performing further processing on data received. In one embodiment, beamforming is not performed until the signal reaches node 120. At this point, node 120 decodes (e.g., applies decoding processing steps) that can result in a beamformed signal. In this embodiment, the coherent summation performed within the array itself does not, in one embodiment, form a beam. Rather, in this embodiment, the coherent summation (or combination) performed within the array aggregates the data for later beamforming processing.

Process 600 may be performed in node 220 or 221, for example. Central node 221 may receive the combined signal 230 (block 602). Central node 221 may also generate an expected signal (block 604) from any given direction, or from a group of different directions. In one embodiment, the location of each node 204, if not known by node 221, may be transmitted to node 221. Central node 221 may generate the expected signal based on the relative locations of nodes 204. Central node 220 may correlate the expected signal with the combined encoded signal (block 606) to "see" in the given direction. In one embodiment, correlating the combined signal with the expected signal may include repeating the step of correlating the combined signal with the expected signal over a first period of time every second period of time. In one embodiment, the second period of time is shorter than the first period of time.

As described above, nodes 204 may be used for beamforming (e.g., collaborative beamforming). The array may be distributed over irregular terrain, for example, may self-calibrate to start operation (e.g., immediately start operation and/or without operator intervention), and may operate in a covert manner for extended periods of time. The array may provide information on the location of emitters (e.g., DoA of adversarial emitters), and may provide an opportunity to receive signals of interest at extended ranges. The array may also be an ad hoc array with elements joining and leaving the array at different times. The ad hoc and/or collaborative beamformer may allow for the identification and geolocation of adversarial emitters. Additionally, one embodiment may allow for increased sensitivity while monitoring signals of interest or communicating with friendly forces at various ranges (e.g., extreme ranges).

In one embodiment, a single, previously combined data stream sent via the backhaul radio link can be reprocessed multiple times (e.g., in parallel) to form multiple (e.g., simultaneous) adaptive beams. This embodiment may allow for reduced bandwidth in the backhaul link as compared to approaches where raw data from all nodes is transferred over the backhaul radio link. Further, this embodiment may provide for more flexibility as compared to an embodiment in which beamforming is performed within the coherent combining of the signals from the nodes in the distributed array.

Geolocation (e.g., DoA) may also play a role in information denial and communications. As radios (e.g., adversarial and/or cognitive radios) are encountered, geolocation (e.g., DoA) of those radios may play a role in defeating them. In one embodiment, the array may play a role in geolocating adversarial radios.

In one embodiment, dispersed radio elements (e.g., randomly dispersed and/or cognitive radios) may provide added ease for deployment. For example, in one embodiment, dispersed cognitive radio elements (e.g., randomly dispersed radios) may be difficult to detect because such an array may deploy radios in locations other than the expected locations of a standard array. Such an array (e.g., formed by randomly dispersed radios) may also provide graceful degradation over periods of time, as long as a sufficient number of elements remain functioning. In one embodiment, low power signals to hop and aggregate signals from each radio (as compared to, for example, conventional beamforming) provides an ability to operate over long periods of time with low probability of detection.

Figure 7:
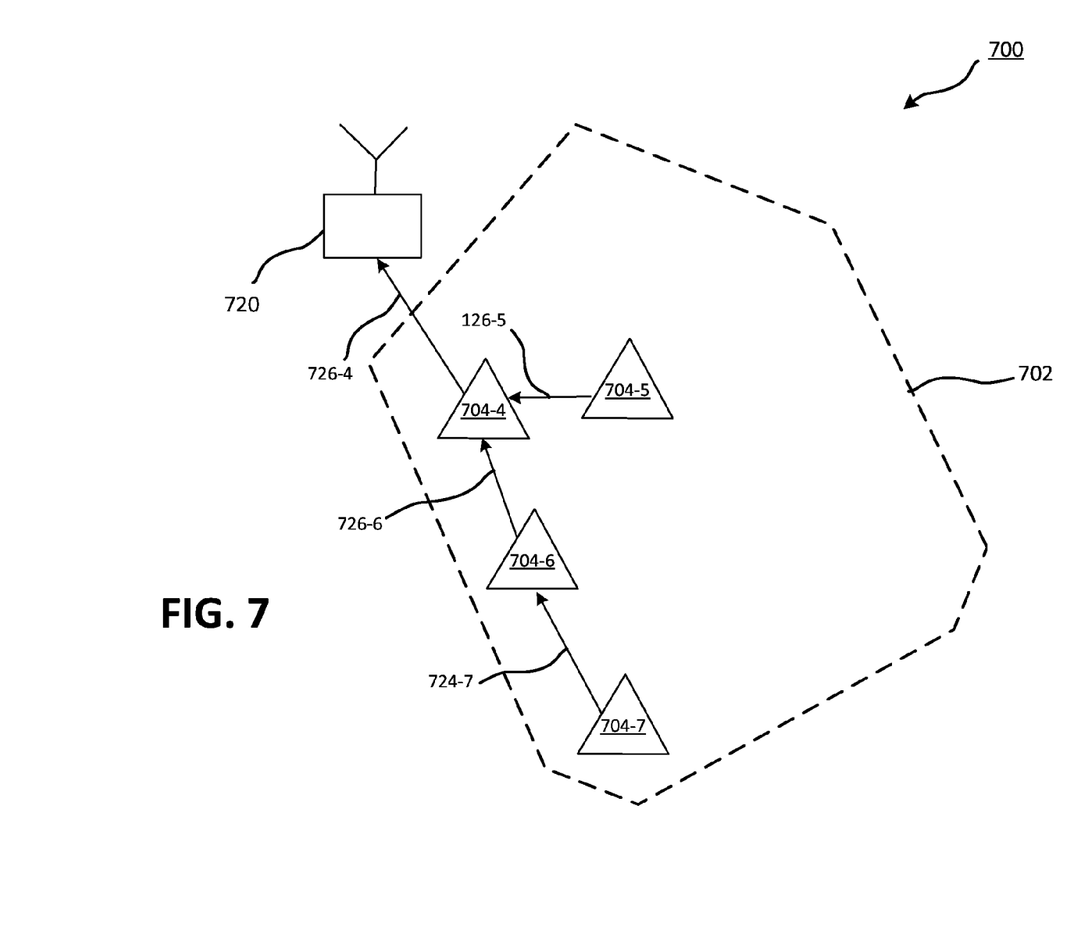
FIGS. 7 and 8 illustrate examples for determining power and bandwidth requirements of embodiments described herein.

FIG. 7 illustrates environment 700 to demonstrate exemplary power requirements of the embodiments described above. The total power required to aggregate the data from the various nodes in environment 700 (as well as environment 200) is proportional to the total number of nodes in the array.

The radio node power required for data aggregation is express by:

$$P_{tot} = \sum_{n=1}^{N_{nodes}} KR^\alpha,$$

where K is a radio system constant associated with one packet of data, R is the range between nodes, α is a propagation constant, and $N_{nodes}$ is the number of nodes (in the case of FIG. 7 the number of nodes is 4). The total throughput at the input to node 720 required to aggregate data is express by:

$$B_{tot} = F \cdot B_{node}$$

Where $B_{node}$ is the data bandwidth form a single node, and F is the data rate growth due to encoding processing.

The embodiments describe above may provide power savings when compared to the approach discussed below with respect to FIG. 8. Also, the aggregated bandwidth for the backhaul data link (e.g., between node 704-4 and node 720) may be reduced relative to the embodiment of FIG. 8, discussed below. The receiver embodiment of FIGS. 2 and 3B, for example, may maintain use of all elements (e.g., without thinning), apply tapering, and/or manage the encoding bandwidth gain (F) independently based on required far-field pattern requirements. This embodiment may allow for more flexible management of far-field pattern characteristics while controlling (e.g., minimizing) backhaul radio throughput.

Figure 8:
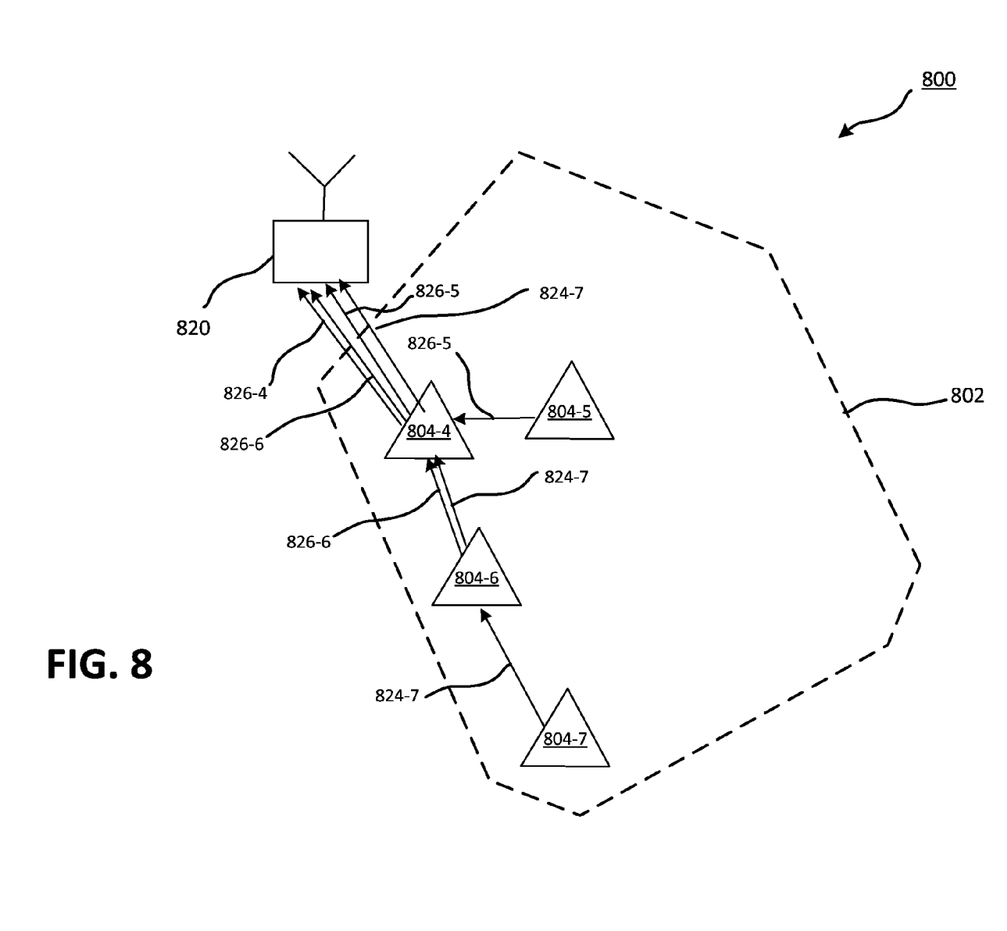

FIG. 8 provides an overview of another embodiment, which includes an adaptive beamforming array. In one embodiment, a single beam is coherently formed. In another embodiment multiple simultaneous beams are adaptively formed using the signals from the distributed set of cognitive radio elements. A four element array is illustrated. Two performance metrics are of interest in the embodiment of FIG. 8. One performance metric includes the amount of transmit power required from all cognitive radio elements to aggregate the received signals. Another performance metric includes the total bandwidth required by node 804-4 to transmit the cognitive radio element signals back to node 820 for further processing.

To support fully adaptive, multiple beam, simultaneous beamforming, the data from each of the distributed elements may be transferred back to a central node (e.g., node 804-4 as shown in FIG. 8) for processing, for example. The resulting total transmit power is proportional to the total number of hops that data from all nodes must make to node 820, which may be significantly larger than the total number of nodes in the distributed array. The resulting aggregated data bandwidth that must be supported across the backhaul data link (e.g., from node 804-4 to location 120) is proportional to the number of elements in the array, since coherent combining in the array itself may limit the degree to which adaptive beamforming can be performed later. Thus, the power in the example of FIG. 8 may be expressed as:

$$P_{tot} = \sum_{n=1}^{N_{hops}} KR^\alpha,$$

Where K is a radio system constant associated with one packet, R is the range between nodes, α is a propagation constant, and $N_{hops}$ is the number of hops (in the case of FIG. 8, $N_{hops}$ is 8). The bandwidth can be expressed as:

$$B_{tot} = N_{nodes} \cdot B_{node},$$

where $B_{node}$ is the data bandwidth from a single node, and $N_{nodes}$ is the number of nodes in the array.

In another embodiment, beam steering processing (e.g., time delays or phase shifts) may be used at the nodes, even in the embodiment of FIG. 2. In this embodiment, the beamforming is performed at least in part before the signal reaches node 220 (e.g., a remote or central location). In one embodiment, beam steering processing (e.g., time delays or phase shifts) may be used in combination with applying a chipping sequence to identify (e.g., uniquely stamp) the signal from each element (e.g., the Elam receiver). While the nodes of the antenna array, in one embodiment, may be dispersed in a random fashion, in another embodiment the nodes of the antenna array may be dispersed in the locations of a standard phased array.

In another embodiment, nodes may be mobile. In this embodiment, the geolocation (e.g., determined by a global positioning system (GPS)) may determine the location of mobile nodes. Location information may be transmitted along with the corresponding signals from each node to the other. The location information may be included as metadata, for example, arranged in an extensible markup language (XML) format. In one embodiment, the location of nodes may be refined and/or determined by processing in node 220. For example, node 220 may know the direction of arrival of known signals at the time corresponding to signals received and processed at each node. Node 220 may then simulate different locations of the nodes until such a known signal comes into "focus," for example. When one or more known signals come into focus, location information of the nodes can be inferred or determined. Even knowing the location of nodes in the environment, node 220 may refine the known locations by simulating slightly different positions of nodes until one or more known signals comes into better focus.

As described above, nodes 204 may be remotely located from each other. In other embodiments, nodes 204 may be collocated in an array. In this embodiment, encoded signals may be combined and forwarded from one node/element to the next node/element. While in such a system the power constraints may not be as limiting, there may be considerable bandwidth constraints in such an array. Thus, combining and forwarding may alleviate bandwidth constraints in an antenna array with closely spaced antenna elements, for example. In this case, there may be a group of digital signal combiners. One combiner receives encoded signals, combines the encoded signals, and forwards the combined signal to a second signal combiner. The second signal combiner adds the received combined signal with other encoded signals and/or combined encoded signals. The number of signal combiners may be the same number (or close to the same number) of receive elements. Or, the number of combiners may be just enough so that the bus carrying the encoded signals is not overwhelmed, for example.

The following patents and applications are hereby incorporated by reference in their entirety: U.S. Pat. No. 7,496,129 to Elam, titled "Method and Apparatus for Space Division Multiple Access Receiver," issued Feb. 24, 2009; U.S. Pat. No. 7,251,286 to Elam, titled "Method and Apparatus for Space Division Multiple Access Receiver," issued Jul. 31, 2007; U.S. Pat. No. 6,833,809 to Elam, titled "Remote Sensing Using Rayleigh Signaling," issued Dec. 24, 2004; U.S. Pat. No. 6,823,021 to Elam, titled "Method and Apparatus for Space Division Multiple Access Receiver," issued Nov. 23, 2004; U.S. Pat. No. 6,608,588 to Elam, titled "Remote Sensing Using Rayleigh Signaling," issued Aug. 19, 2003; patent application Ser. No. 10/354,093, to Elam, titled "Method and Apparatus for Broadcasting with Spatially Diverse Signals," filed Jan. 30, 2003, U.S. Patent Application Publication No. 20030139195, titled "Method and Apparatus for Broadcasting with Spatially Diverse Signals, published Jul. 24, 2003; U.S. Patent Application Publication No. 20040092277, to Elam, titled "Method and Apparatus for Broadcasting with Spatially Diverse Signals," published May 13, 2004; U.S. Provisional Application No. 60/352,266, to Elam, titled "Broadcasting with spatially diverse spread-spectrum signals," filed Jan. 30, 2002; U.S. Provisional Application No. 60/202,055, to Elam, titled "Broadcasting and receiving using mathematical signaling," filed May 5, 2000.

In one or more embodiments, the Elam receiver may be implemented in the manner described in the applications and patents mentioned above or the articles that follow. In one embodiment, each node shown in FIG. 1 through FIG. 3 may be implemented as any of the antennas elements in the receivers described in the applications or patents cited above or the articles that follow.

What is claimed is:

1. A method for receiving signals in a receiver having a plurality of receive elements, the method comprising:
    receiving a transmitted signal in a plurality of receive elements to form a plurality of receive element signals;
    generating a plurality of uncorrelated chipping sequences;
    encoding each the plurality of receive element signals with a different one of the chipping sequences to form a plurality of encoded signals, wherein the plurality of encoded signals includes a first encoded signal, a second encoded signal, and a third encoded signal; and
    combining the plurality of encoded signals into a combined signal, wherein combining includes:
        combining the first encoded signal with the second encoded signal to generate a first combined signal; and
        combining the first combined signal with information indicative of the third encoded signal to generate a second combined signal.

2. The method of claim 1,
    wherein combining the first encoded signal with the second encoded signal includes combining with a first signal combiner;
    wherein combining the first combined signal with the third encoded signal includes combining with a second signal combiner different than the first signal combiner.

3. The method of claim 2, further comprising:
    forwarding the first combined signal from the first signal combiner to the second signal combiner.

4. The method of claim 3, wherein forwarding includes wirelessly transmitting the first combined signal from the first signal combiner to the second signal combiner.

5. The method of claim 2, further comprising detecting the transmitted signals from the combined signal.

6. The method of claim 5, further comprising extracting information from the detected transmitted signal.

7. The method of claim 2, further comprising generating an expected signal; and correlating the combined signal with the expected signal to form a correlation signal.

8. The method of claim 7, wherein generating an expected signal comprises generating the expected signal as a function of the plurality of chipping sequences.

9. The method of claim 7, wherein generating the expected signal comprises generating the expected signal from a particular direction.

10. The method of claim 9,
    wherein generating the expected signal comprises generating a plurality of expected signals from a plurality of directions; and
    wherein correlating the combined signal comprises correlating the combined signal with each of the plurality of expected signals from each of the plurality of directions to form a plurality of correlation signals.

11. The method of claim 7, wherein correlating the combined signal with the expected signal comprises repeating correlating the combined signal with the expected signal over a first period of time every second period of time, wherein the second period of time is shorter than the first period of time.

12. A receiver comprising:
a plurality of receive elements, each receiving a transmitted signal to form a plurality of receive element signals;
a plurality of encoders to generate a plurality of uncorrelated chipping sequences, wherein each encoder encodes each of the plurality of receive element signals with a different one of the chipping sequences to form a plurality of encoded signals, wherein the plurality of encoded signals includes a first encoded signal, a second encoded signal, and a third encoded signal; and
a plurality of signal combiners to combine the plurality of encoded signals into a combined signal,
wherein the plurality of signal combiners includes a first signal combiner and a second signal combiner different than the first signal combiner,
wherein the first signal combiner combines the first encoded signal and the second encoded signal to generate a first combined signal, and
wherein the second signal combiner combines the first combined signal and information indicative of the third encoded signal to generate a second combined signal.

13. The receiver of claim 12, further comprising:
a transmitter to forward the first combined signal from the first signal combiner to the second signal combiner.

14. The receiver of claim 13, wherein forwarding includes wirelessly transmitting the first combined signal from the first signal combiner to the second signal combiner.

15. The receiver of claim 12, further comprising a processor to detect the transmitted signals from the combined signal and extract information from the detected transmitted signal.

16. The receiver of claim 12, further comprising
a generator to generate an expected signal; and
a correlator to correlate the combined signal with the expected signal to form a correlation signal.

17. The receiver of claim 16, wherein the generator generates the expected signal as a function of the plurality of chipping sequences.

18. The receiver of claim 16, wherein the generator generates the expected signal from a particular direction.

19. The receiver of claim 18,
wherein the generator generates a plurality of expected signals from a plurality of directions; and
wherein the correlator correlates the combined signal with each of the plurality of expected signals from each of the plurality of directions to form a plurality of correlation signals.

20. The receiver of claim 16, wherein the correlator repeats correlating the combined signal with the expected signal over a first period of time every second period of time, wherein the second period of time is shorter than the first period of time.

* * * * *